(12) United States Patent
Geris et al.

(10) Patent No.: US 9,167,375 B2
(45) Date of Patent: Oct. 20, 2015

(54) DEVICE FOR DETECTING A CARRYING CASE USING ORIENTATION SIGNATURES

(71) Applicant: RESEARCH IN MOTION LIMITED, Waterloo (CA)

(72) Inventors: Ryan Alexander Geris, Kitchener (CA); Krzysztof Zawada, East Hazel Crest, IL (US); Peter Mankowski, Waterloo (CA); Hussein Bahadur Nagji, Kitchener (CA)

(73) Assignee: BlackBerry Limited, Waterloo, Ontario (CA)

( * ) Notice: Subject to any disclaimer, the term of this patent is extended or adjusted under 35 U.S.C. 154(b) by 117 days.

(21) Appl. No.: 13/911,899

(22) Filed: Jun. 6, 2013

(65) Prior Publication Data

US 2014/0364055 A1    Dec. 11, 2014

(51) Int. Cl.
    H04W 8/18    (2009.01)
    H04W 4/00    (2009.01)
    H04M 1/04    (2006.01)

(52) U.S. Cl.
    CPC .............. *H04W 4/008* (2013.01); *H04M 1/04* (2013.01); *H04M 2250/04* (2013.01); *H04M 2250/12* (2013.01)

(58) Field of Classification Search
    USPC ............... 455/414.1, 41.1, 67.13, 566, 575.1, 455/575.6; 345/173, 156
    See application file for complete search history.

(56) References Cited

U.S. PATENT DOCUMENTS

| | | | |
|---|---|---|---|
| 5,517,183 A * | 5/1996 | Bozeman, Jr. ................ | 340/669 |
| 6,532,001 B1 * | 3/2003 | Taraki et al. ................. | 345/163 |
| 8,170,621 B1 | 5/2012 | Lockwood | |
| 8,290,480 B2 | 10/2012 | Abramson et al. | |
| 2001/0024967 A1 * | 9/2001 | Bauer .......................... | 455/574 |
| 2004/0074966 A1 * | 4/2004 | Holzer ......................... | 235/385 |
| 2005/0227750 A1 * | 10/2005 | Brase et al. ....................... | 463/1 |
| 2007/0182710 A1 * | 8/2007 | MacDonald et al. ......... | 345/156 |
| 2007/0274563 A1 * | 11/2007 | Jung et al. .................... | 382/103 |
| 2008/0130417 A1 * | 6/2008 | Bhavnani ....................... | 368/11 |
| 2008/0218493 A1 * | 9/2008 | Patten et al. .................. | 345/173 |
| 2008/0255795 A1 * | 10/2008 | Shkolnikov ................... | 702/141 |
| 2009/0146962 A1 * | 6/2009 | Ahonen et al. ................ | 345/173 |
| 2009/0219166 A1 * | 9/2009 | MacFarlane et al. ...... | 340/691.4 |

(Continued)

FOREIGN PATENT DOCUMENTS

| | | |
|---|---|---|
| DE | 202012011370 U1 | 1/2013 |
| EP | 1959332 A1 | 8/2008 |
| EP | 2261767 A2 | 12/2010 |
| EP | 2474878 A1 | 7/2012 |
| EP | 2487884 A1 | 8/2012 |
| WO | 2011163350 A1 | 12/2011 |

OTHER PUBLICATIONS

Extended European Search report mailed Nov. 20, 2013, in corresponding European patent application No. 13170934.7.

(Continued)

*Primary Examiner* — Minh D Dao
(74) *Attorney, Agent, or Firm* — Fish & Richardson P.C.

(57) ABSTRACT

A device for detecting a carrying case using orientation signatures, and method therefor, is provided. The device includes: at least one orientation sensor; a memory storing one or more carrying-case insertion signatures; and, a processor configured to: receive output from the at least one orientation sensor as a function of time; and place the device in a carrying case mode when a time-dependent pattern in the output matches the one or more carrying-case insertion signatures.

20 Claims, 7 Drawing Sheets

(56) References Cited

U.S. PATENT DOCUMENTS

| | | |
|---|---|---|
| 2011/0190953 A1 | 8/2011 | Park et al. |
| 2012/0221290 A1 | 8/2012 | Oka et al. |
| 2012/0259578 A1 | 10/2012 | Bevilacqua et al. |
| 2012/0265482 A1 | 10/2012 | Grokop et al. |
| 2012/0290257 A1 | 11/2012 | Hodge et al. |
| 2013/0040560 A1 | 2/2013 | Kennedy et al. |
| 2013/0117153 A1* | 5/2013 | Shen .......................... 705/26.9 |
| 2013/0269798 A1* | 10/2013 | Wood ............................ 137/551 |
| 2014/0152818 A1* | 6/2014 | Na et al. ....................... 348/143 |
| 2014/0184471 A1* | 7/2014 | Martynov et al. .............. 345/1.2 |
| 2014/0187256 A1* | 7/2014 | Modali et al. .............. 455/456.1 |
| 2014/0204017 A1* | 7/2014 | Wu ............................... 345/156 |

OTHER PUBLICATIONS

Extended European Search report mailed Nov. 29, 2013, in corresponding European patent application No. 13170915.6.

English abstract for DE202012011370; published on Jan. 15, 2013 and retrieved on Jan. 21, 2014.

U.S. Appl. No. 13/891,420, filed May 10, 2013 Title: A Device for Providing Notifications While Mated With a Carrying Case Inventors: Abdelsamie et al.

Office Action issued in U.S. Appl. No. 13/911,235 on Jul. 17, 2015; 26 pages.

* cited by examiner

DEVICE FOR DETECTING A CARRYING CASE USING ORIENTATION SIGNATURES

FIELD

The specification relates generally to devices, and specifically to a device for detecting a carrying case using orientation signatures.

BACKGROUND

The evolution of computers is currently quite active in the mobile device environment. Magnets in carrying cases are generally used by devices received therein to detect when the device is received in the carrying case via Hall effect sensors and the like. However, magnets are rapidly becoming prohibitively expensive.

BRIEF DESCRIPTIONS OF THE DRAWINGS

For a better understanding of the various implementations described herein and to show more clearly how they may be carried into effect, reference will now be made, by way of example only, to the accompanying drawings in which.

DETAILED DESCRIPTION

In general, this disclosure is directed to a device, and in particular a mobile electronic device, for use with a carrying case. In general, mobile electronic devices represent electronic devices that are readily movable from place to place. Such devices typically are placed into a carrying case mode when received in a carrying case. For example, carrying cases typically can include one or more magnets, such as rare earth magnets; however the cost of magnets, and especially rare earth magnets, is increasing as the demand for magnet materials, and especially rare earth magnet materials, is increasing, as is the cost of the rare earth metals used in their manufacture. Furthermore, the mining of rare earth metals can be harmful to the environment due to the use of aggressive acids in their extraction from the ground. Hence, eliminating magnets, and especially rare earth magnets, from carrying cases is desirable to reduce the cost of carrying cases and to provide an environmentally friendly (e.g. "green") product. However, detection of the carrying case by a device can then be challenging. This specification hence describes various implementations of a device that can detect a carrying case without the use of magnets.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

Furthermore, as will become apparent, in this specification certain elements may be described as mated, coupled or connected physically, electronically, optically, communicatively, mechanically or any combination thereof, according to context. Hence, in this disclosure, "enabled to mate" refers to a communicative coupling and typically a physical coupling as well. In general, components that are communicatively coupled are configured to communicate (that is, they are capable of communicating) in any fashion for any duration, such as by way of electric signals, optical signals, wireless signals, or any combination thereof. The communication may be one-way or two-way communication. Components are "physically coupled" when they are attached or connected or joined to one another, in any fashion, whether releasably or substantially permanently, so that physical activity of one component generally affects the other. The physical attachment may be direct or by way of one or more intermediate elements. According to context, two components that are physically coupled may behave as a single element. In some cases, physically coupled elements may be integrally formed, e.g., part of a single-piece article that may share structures and materials. In other cases, physically coupled elements may comprise discrete components that may be fastened together in any fashion. Physical coupling may also include a combination of discrete components fastened together, and components fashioned as a single piece.

In this specification, elements may be described as "obscured" and/or "exposed". In general, an element that is obscured is one or more of not visible to a user, not viewable, covered, blocked, concealed, hidden, and the like. Similarly, an element that is exposed is one or more of visible to a user, uncovered, revealed, viewable, and the like.

An aspect of the specification provides a device comprising: at least one orientation sensor; a memory storing one or more carrying-case insertion signatures; and, a processor configured to: receive output from the at least one orientation sensor as a function of time; and place the device in a carrying case mode when a time-dependent pattern in the output matches the one or more carrying-case insertion signatures.

The time-dependent pattern can comprise an acceleration of the device as a function of time.

The memory can further store one or more carrying-case removal signatures and the processor can be further configured to place the device in an out-of-carrying case mode when the time-dependent pattern in the output matches the one or more carrying-case removal signatures.

The processor can be further configured to track an average of the time-dependent pattern and store at least a portion of the average in the memory as the one or more carrying-case insertion signatures when the time-dependent pattern matches the one or more carrying-case insertion signatures.

The at least one orientation sensor can be configured to measure the orientation of the device in one or more directions, and the one or more carrying-case insertion signatures can comprise a respective signature for each of the one or more directions.

The processor can be further configured to provision the one or more carrying-case insertion signatures at the memory by: receiving input at an input device to begin monitoring the output from the at least one orientation sensor as a function of time; and, storing the output from the at least one orientation sensor as a function of time at the memory as the one or more carrying-case insertion signatures.

The device can further comprise at least one sensor for determining one or more of a velocity and an acceleration of the device, and the processor can be further configured to adjust a sampling rate of the at least one orientation sensor based on one or more of the velocity and the acceleration.

The device can further comprise one or more of a near field communication (NFC) reader and a short range RF (radio-frequency) reader and the processor can be further configured to confirm carrying-case insertion when the time-dependent pattern in the output matches the one or more carrying-case insertion signatures and the one or more of the NFC reader and the short range RF reader detects one or more of an NFC tag and a short range RF tag.

The processor can be further configured to filter noise from the time-dependent pattern in the output.

The carrying case mode can comprise one or more of: a sleep mode, a peek mode, and a quiet mode.

The orientation sensor can comprise one or more of a gyroscope, an accelerometer, and a magnetometer.

Another aspect of the specification provides a method comprising: at a device comprising: at least one orientation sensor; a memory storing one or more carrying-case insertion signatures; and, a processor, receiving output at the processor from the at least one orientation sensor as a function of time; and, the processor placing the device in a carrying case mode a time-dependent pattern in the output matches the one or more carrying-case insertion signatures.

The time-dependent pattern can comprise an acceleration of the device as a function of time.

The memory can further store one or more carrying-case removal signatures and the method can further comprise placing the device in an out-of-carrying case mode when the time-dependent pattern in the output matches the one or more carrying-case removal signatures.

The method can further comprise: tracking an average of the time-dependent pattern; and storing at least a portion of the average in the memory as the one or more carrying-case insertion signatures when the time-dependent pattern matches the one or more carrying-case insertion signatures.

The at least one orientation sensor can be configured to measure the orientation of the device in one or more directions, and the one or more carrying-case insertion signatures can comprise a respective signature for each of the one or more directions.

The method can further comprise provisioning the one or more carrying-case insertion signatures at the memory by: receiving input at an input device to begin monitoring the output from the at least one orientation sensor as a function of time; and, storing the output from the at least one orientation sensor as a function of time at the memory as the one or more carrying-case insertion signatures.

The device can further comprise at least one sensor for determining one or more of a velocity and an acceleration of the device, and the method can further comprise adjusting a sampling rate of the at least one orientation sensor based on one or more of the velocity and the acceleration.

The device can further comprise one or more of a near field communication (NFC) reader and a short range RF (radio-frequency) reader and the method can further comprise confirming carrying-case insertion when the time-dependent pattern in the output matches the one or more carrying-case insertion signatures and the one or more of the NFC reader and the short range RF reader detects one or more of an NFC tag and a short range RF tag.

The method can further comprise filtering noise from the time-dependent pattern in the output.

The carrying case mode can comprise one or more of: a sleep mode, a peek mode, and a quiet mode.

Yet a further aspect of the specification provides a computer program product, comprising a computer usable medium having a computer readable program code adapted to be executed to implement a method comprising: at a device comprising: at least one orientation sensor; a memory storing one or more carrying-case insertion signatures; and, a processor, receiving output at the processor from the at least one orientation sensor as a function of time; and, placing the device in a carrying case mode when the processor determines that a time-dependent pattern in the output matches the one or more carrying-case insertion signatures. The computer usable medium can comprise a non-transitory computer usable medium.

Figure 1:
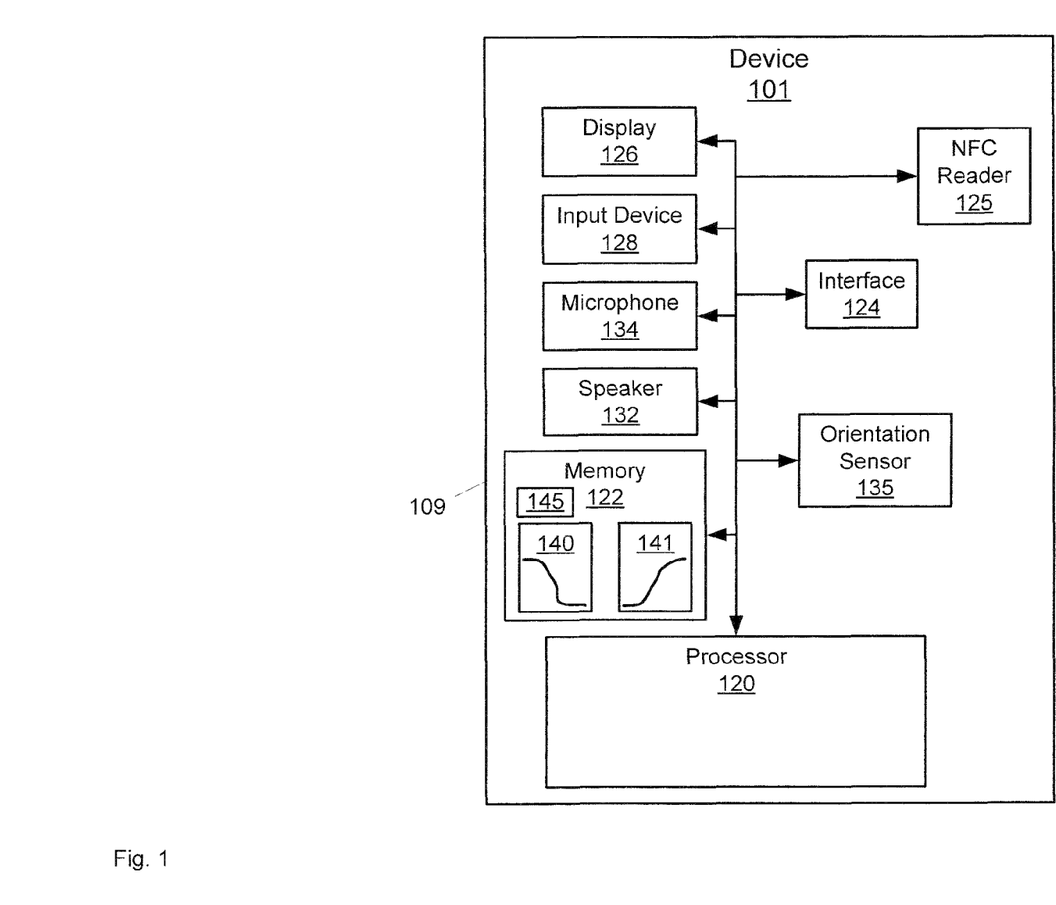
FIG. 1 depicts a schematic diagram a device for detecting a carrying case using orientation signatures, according to non-limiting implementations.

FIG. 1 depicts a device 101 for detecting a carrying case using orientation signatures, according to non-limiting implementations. Device 101 comprises a housing 109, which houses a processor 120 interconnected with a memory 122, a communications interface 124, an optional near field communication (NFC) reader 125 (and/or a short range RF (radio-frequency) reader), a display 126, an input device 128, a speaker 132, a microphone 134, and at least one orientation sensor 135. Communications interface 124 will be interchangeably referred to as interface 124. In general, memory 122 stores one or more carrying-case insertion signatures 140 and one or more carrying-case removal signatures 141, described in further detail below. Processor 120 is generally configured to: receive output from at least one orientation sensor 135 as a function of time; and place device 101 in a carrying case mode when a time-dependent pattern in the output matches one or more carrying-case insertion signatures 140. In particular, processor 120 can be configured to determine an acceleration of device 101 using output of at least one orientation sensor 135, and the time-dependent pattern can comprise an acceleration of device 101 as a function of time, for example by sampling the output of at least one orientation sensor 135 periodically and/or at discrete points in time, such processor 120 can determine how acceleration of device 101 is changing over time.

Similarly, processor 120 can be further configured to place device 101 in an out-of-carrying case mode when the time-dependent pattern in the output of the at least one orientation sensor 135 matches one or more carrying-case removal signatures 141.

Device 101 is generally configured to enter a carrying case mode when received in a carrying case: for example, in some carrying case modes, processor 120 can control device 101 and/or components at device 101 to enter a sleep mode and/or turn off. Indeed, carrying case modes can include, but are not limited to, a sleep mode, a quiet mode, and a peek mode, in which display 126 and the like are controlled to provide notifications and the like at areas that are not obscured by a carrying case, for example to provide notifications of events, including, but not limited to, receipt of a message (e.g. emails, text messages etc.), receipt of a phone call, a calendar event and/or a calendar event reminder as indicated in, for example, a calendar database, and the like. In general, a carrying case mode refers to the way or ways in which device 101 behaves or operates or responds or otherwise functions when it is in (or mated with) a carrying case, such as carrying case 103, as opposed to the way in which device 101 functions when device 101 is out of the carrying case. When device 101 is in the carrying case, device 101 can automatically disable or turn off or reduce some of its own functionality, for example; device 101 can also activate or change other functionality.

Further, device 101 is generally configured to enter an out-of-carrying case mode when removed from a carrying case. The out-of-carrying-case mode can include, but is not limited to, a normal mode, a wake mode, and the like in which display 126 and the like are controlled to provide notifications assuming that display 126 is not obscured by the carrying case; hence no specific restrictions, with regard to the carrying case obscuring display 126, are placed on where to provide notifications on display 126, for example when providing notifications of events, including, but not limited to, receipt of a message (e.g. emails, text messages etc.), receipt of a phone call, a calendar event and/or a calendar event reminder as indicated in, for example, a calendar database, and the like. In general, an out-of-carrying case mode refers to the way or ways in which device 101 behaves or operates or responds or otherwise functions when it is out of (and/or not mated with) a carrying case, as opposed to the way in which device 101 functions when device 101 is in a carrying case. When device 101 is removed from a carrying case, device 101 can automatically turn on or increase some of its own functionality, for example. Device 101 may also activate or change other functionality. Indeed, as described earlier, this is contrast to when device 101 is in a carrying case and notifications can be restricted to notifications that are not obscured by the carrying case.

It is appreciated that FIG. 1 further depicts a schematic diagram of device 101, which will be hereafter be described in further detail. It should be emphasized that the structure of device 101 in FIG. 1 is purely an example. For example, as depicted in FIG. 1, it is contemplated that device 101 comprises a device that can be used for implementing both wireless voice (e.g. telephony) and wireless data communications (e.g. email, web browsing, text, and the like), as well as any other specialized functions, including, but not limited to, one or more of, computing, and/or entertainment related functions.

Housing 109 can comprise any housing, casing, and the like. It is appreciated that device 101 can be portable (readily movable from place to place) and, in some implementations, device 101 can be handheld (sized and shaped to be held or carried in a human hand, and typically used while so held or carried); hence, housing 109 can be configured for a type of device 101. In general, housing 109 encloses or houses the components of device 101; however some components can be visible via apertures, windows and the like in housing 109. For example, display 126 is generally visible.

At least one input device 128 is generally configured to receive input data, and can comprise any suitable combination of input devices, including but not limited to a keyboard, a keypad, a pointing device, a mouse, a track wheel, a trackball, a touchpad, a touch screen and the like. Other input devices are within the scope of present implementations.

Input from input device 128 is received at processor 120 (which can be implemented as a plurality of processors, including but not limited to one or more central processors (CPUs). Processor 120 is configured to communicate with a memory 122 comprising a non-volatile storage unit (e.g. Erasable Electronic Programmable Read Only Memory ("EEPROM"), Flash Memory, and the like) and a volatile storage unit (e.g. random access memory ("RAM"), and the like). Programming instructions that implement the functional teachings of device 101 as described herein are typically maintained, persistently, in memory 122 and used by processor 120 which makes appropriate utilization of volatile storage during the execution of such programming instructions. In some implementations, processor 120 comprises at least a portion of memory 122, for example as on-board random access memory (RAM). It is further appreciated that memory 122 is an example of computer readable media that can store programming instructions executable on processor 120. Furthermore, memory 122 is also an example of a memory unit and/or memory module.

In particular, it is appreciated that memory 122 stores application 145, that, when processed by processor 120, enables processor 120 to: receive output from at least one orientation sensor 135 as a function of time; and place device 101 in a carrying case mode when a time-dependent pattern in the output matches the one or more carrying-case insertion signatures 140. In particular the time-dependent pattern can comprise an acceleration of device 101 as a function of time and/or a velocity of device 101 as a function of time and/or an orientation of device 101 as a function of time. In other words, the time-dependent pattern can be indicative of how acceleration and/or velocity of device 101 is changing between discrete points in time and/or over a given time period. Furthermore, the term "given time period" is appreciated to refer to a particular time period and/or a time period of significance; a given time period can also be generally predetermined and/or configured at device 101 by storing the given time period at memory 122 either within application 145 and/or separate from application 145. Furthermore, the acceleration and/or velocity and/or orientation can be determined in any given direction with respect to device 101, as described in further detail below.

In some implementations, application 145 can store one or more carrying-case insertion signatures 140 and one or more carrying-case removal signatures 141. However, as depicted, one or more carrying-case insertion signatures 140 and one or more carrying-case removal signatures 141 are stored at memory 122 separate from application 145. Indeed, one or more carrying-case insertion signatures 140 and one or more carrying-case removal signatures 141 can be stored at any of the memory devices described heretofore. One or more carrying-case insertion signatures 140 and one or more carrying-case removal signatures 141 are described in further detail below.

Processor 120 can be further configured to communicate with display 126, microphone 134 and speaker 132. Display 126 comprises any suitable one of, or combination of, CRT (cathode ray tube) and/or flat panel displays (e.g. LCD (liquid crystal display), plasma, OLED (organic light emitting diode), capacitive or resistive touch screens, and the like)). Microphone 134 comprises a microphone for receiving sound data at device 101. Speaker 132 comprises a speaker for providing sound data, audible alerts, audible communications from remote communication devices, and the like, at device 101. Processor 120 can also control one or more of display 126 and speaker 132 to provide notifications. In some implementations, device 101 can further comprise an indicator, for example an LED (light emitting diode), a light and the like that can also be configured to provide notifications.

Processor 120 can also connect to optional NFC reader 125 which is configured to wirelessly communicate with at least one NFC tag, for example an NFC tag at a carrying case as will be described below. In some implementations, NFC reader 125 comprises a near field communication (NFC) antenna and hence, in these implementations, NFC reader 125 comprises an NFC interface for wirelessly transmitting and receiving NFC signals via an NFC antenna. Indeed, in general, NFC reader 125 can include, but is not limited to, a short range RF reader, an NFC reader, an NFC antenna, a RFID (radio-frequency identifier) reader, and the like. In other words, while the term "NFC" can refer to a specific standard, present implementations are not so limited, and a device 101 can include any short range RF reader configured to detect corresponding short range RF tags.

Interface 124 (and/or another communications interface, not depicted) can be implemented as one or more radios and/or connectors and/or network adaptors, configured to wirelessly communicate with one or more communication networks (not depicted) and/or wireless communication networks and/or wired communication networks and/or wireless transceivers. It will be appreciated that, in these implementations, interface 124 can be configured to correspond with network architecture that is used to implement one or more communication links to the one or more communication networks, including but not limited to any suitable combination of USB (universal serial bus) cables, serial cables, wireless links, cell-phone links, cellular network links (including but not limited to 2G, 2.5G, 3G, 4G+, UMTS (Universal Mobile Telecommunications System), CDMA (Code division multiple access), WCDMA (Wideband CDMA), FDD (frequency division duplexing), TDD (time division duplexing), TDD-LTE (TDD-Long Term Evolution), TD-SCDMA (Time Division Synchronous Code Division Multiple Access) and the like, wireless data, Bluetooth links, NFC (near field communication) links, WiFi links, WiMax links, packet based links, the Internet, analog networks, the PSTN (public switched telephone network), access points, and the like, and/or a combination. When interface 124 is configured to communicate with one or more communication networks, interface 124 can comprise further protocol specific antennas there for (not depicted).

At least one orientation sensor 135 can comprise one or more of a gyroscope, an accelerometer, a magnetometer and the like. In particular, at least one orientation sensor 135 is configured to measure an orientation of device 101, for example an angle of device 101 with respect to the ground and/or the earth and/or a magnetic field of the earth including, but not limited to, an angle indicative of device 101 being about vertical to the ground and an angle indicative of device 101 being about horizontal to the ground. Output of at least one orientation sensor 135 can be received at processor 120 periodically by processor 120 requesting output from at least one orientation sensor 135 and/or by at least one orientation sensor 135 periodically pushing output to processor 120. The rate at which output of at least one orientation sensor 135 is received at processor 120 is the sampling rate.

Furthermore, while output of at least one orientation sensor 135 is generally indicative of an angle of device 101 with respect to the ground, output of at least one orientation sensor 135 need not comprise angular data (i.e. 0°, 90°, and the like); rather output of at least one orientation sensor 135 can comprise one or more of current, a current value, a voltage, a voltage value and the like, indicative of an angle. Regardless, processor 120 can be configured to determine an acceleration of device 101 using output of at least one orientation sensor 135.

Furthermore, in some implementations, at least one orientation sensor 135 can be configured to measure orientation of device 101 in one or more directions, for example perpendicular to a front and/or a rear of device 101, a longitudinally (e.g. from a top to bottom of device 101) and/or laterally (e.g. from a left side to a right side of device 101).

Alternatively, the at least one orientation sensor 135 can be configured to measure one or more of acceleration and velocity of device 101 in one or more directions.

While not depicted, it is yet further appreciated that device 101 comprises a battery and/or a power pack, or any other suitable power source.

In any event, it should be understood that a wide variety of configurations for device 101 are contemplated.

Figure 2:
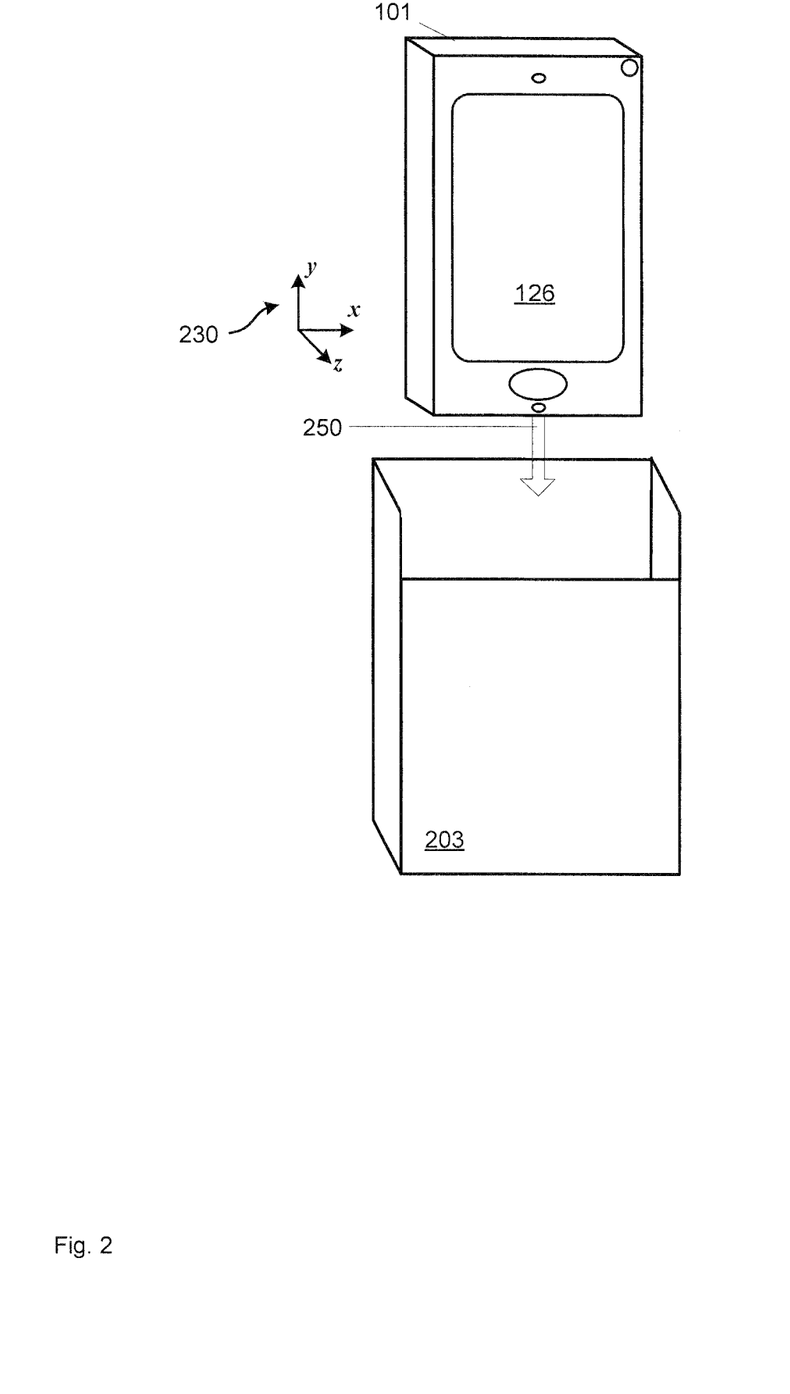
FIG. 2 depicts a perspective view of the device of FIG. 1 being inserted into a carrying case, according to non-limiting implementations.

Attention is next directed to FIG. 2, which depicts a perspective view of device 101 being inserted into a carrying case 203 as indicated by arrow 250. Carrying case 203 is generally configured to mate with device 101 and/or housing 109. Carrying case 203 can hence comprise any suitable apparatus for carrying device 101, including, but not limited to, a holster, a sleeve, a sheath, a wallet, a folder, a portfolio, a bag, a cover, and/or other receptacle. In some of these implementations, carrying case 203 can enclose and/or fully enclose device 101; however, in other implementations, carrying case 203 need not fully enclose device 101. For example, carrying case 203 can comprise windows and/or apertures which can be used, for example, to view display 126 and/or can be provided for design and/or aesthetic purposes. In particular, carrying case 203 does not include a magnet. However, in other implementations, one or more of carrying case 203 and device 101 can comprise a magnet and the other of carrying case 203 and device 201 can comprise a magnetic material that can removably join carrying case 203 to device 101 when in the carrying-case mode. Alternatively, magnets can be used to fasten a flap of carrying case 203 to a body of carrying case 203. However, such magnets may, or may not, interact with, for example, a hall sensor of device 101; indeed, such magnets can be used for mating and/or joining carrying case 203 to device 101 and not for detection of carrying case 203 by device 101.

While not depicted, it is appreciated that carrying case 203 can further comprise a clip for clipping carrying case 203 to one or more of a belt, clothing, a backpack, and the like.

It is further appreciated that FIG. 2 depicts an exterior of device 101 and while internal components, such as processor 120 and at least one orientation sensor 135 are not visible, they are nonetheless present in device 101.

In any event, in FIG. 2 device 101 is being inserted into carrying case 203 in a portrait orientation (i.e. along a longitudinal axis of device 101). That is, with reference to coordinate system 230, device 101 is being inserted into carrying case along the y-axis; it is appreciated that coordinate system 230 is provided with respect to device 101 and not to the ground; for example, the x-axis is along a lateral axis of device 101, the y-axis is along the longitudinal axis of device 101 and the z-axis of coordinate system 230 is perpendicular to display 126. Further, as device 101 is being inserted into carrying case 203, processor 120 generally receives output from at least one orientation sensor 135 as a function of time and compares the output to one or more carrying-case insertion signatures 140.

Figure 3:
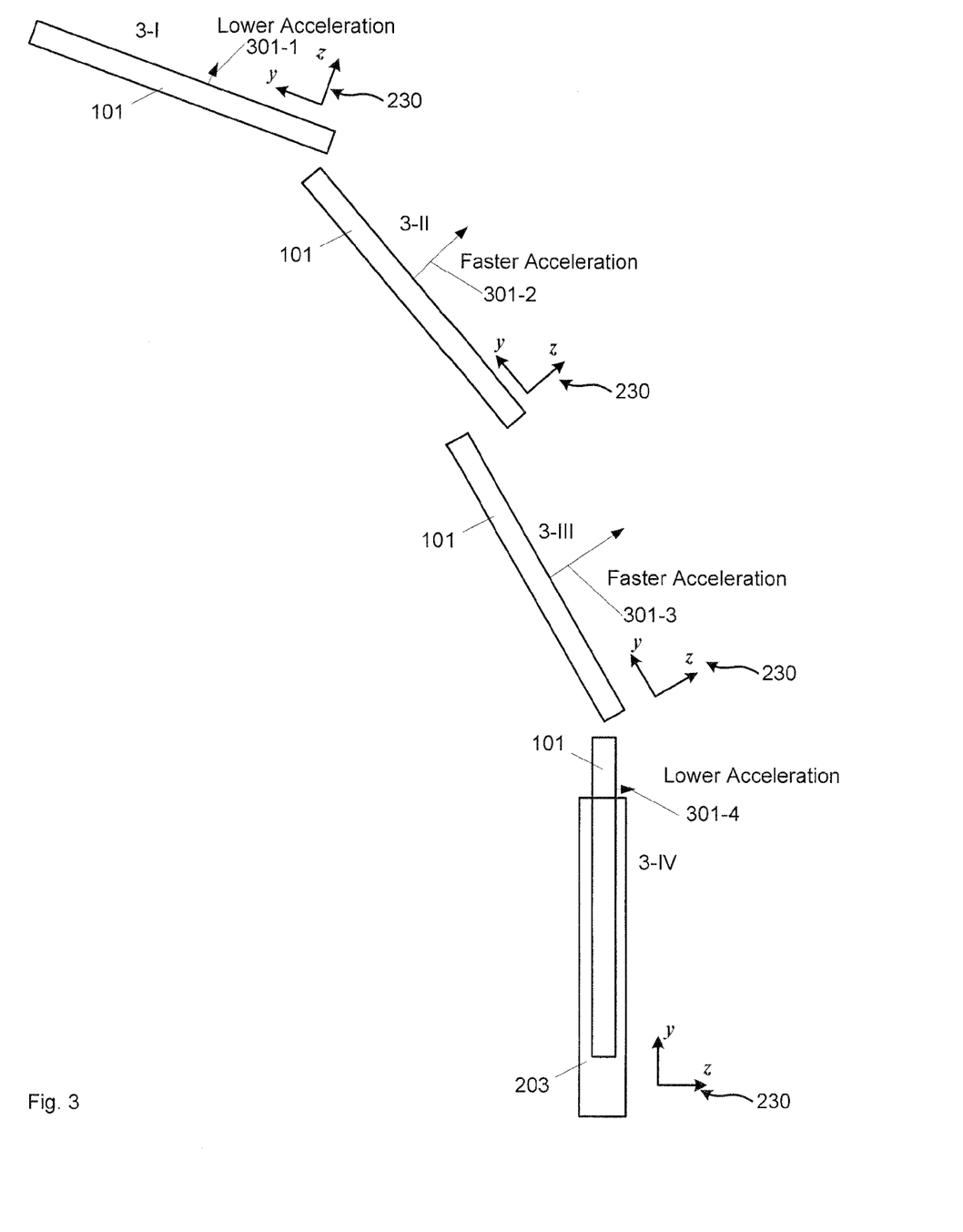
FIG. 3 depicts a schematic a side view of the device of FIG. 1 being inserted into a carrying case, and specifically four different positions and orientations of the device as the device is being inserted into the carrying case, according to non-limiting implementations.

For example, attention is next directed to FIG. 3, which depicts a schematic side view of device 101 being inserted into carrying case 203, and specifically four different positions 3-I, 3-II, 3-III, 3-IV and orientations of device 101 as device 101 is being inserted into carrying case 203. Coordinate system 230 is also depicted at each position 230, the z-axis being perpendicular to display 126 (not visible in FIG. 3), and the y-axis being between a top of device 101 to a bottom of device 101. While not depicted, it is understood that the x-axis is coming out of the page.

FIG. 3 also schematically depicts relative accelerations 301-1, 301-2, 301-3 301-4 at each position 3-I, 3-II, 3-III, 3-IV, as represented by lengths of the depicted arrows, accelerations 301-1, 301-2, 301-3 301-4 along the z-axis of coordinate system 230; in other words, device 101 accelerates in the z-direction when being inserted into device 101. While the example in FIG. 3 only depicts acceleration along the z-axis, it is appreciated that acceleration can also occur along the x-axis and the y-axis.

In any event, it appreciated that at position 3-I, device 101 is generally facing upwards, and then undergoes a change in orientation between positions 3-I, 3-II, and a corresponding increase in acceleration. Orientation and acceleration continue to change between positions 3-II, 3-III, until device 101 slows at position 3-IV, just prior to the insertion being completed.

Furthermore, the orientation and acceleration of device 101 can be affected by device 101 rubbing against one or more of an edge and an inside surface of carrying case 203 as device 101 is inserted therein and/or removed there from. For example, a carrying case that is made from plastic will affect, for example, acceleration 301-4 differently than a carrying case that is cloth-lined. In other words, a frictional coefficient of carrying case 203 can affect acceleration of device 101 as device 101 is inserted or removed from carrying case 203. Furthermore, a physical configuration of device 101 can affect acceleration 301-4; for example an edge and/or an inside of carrying case 203 can comprise protrusions that cause variation in the acceleration of device 101 as device 101 is inserted therein and/or removed there from. Alternatively a configuration of an aperture of carrying case 203 where device 101 is received can affect acceleration of device 101 as device 101 is inserted into and/or removed there from; for example a wide aperture can cause a different acceleration profile than a narrow aperture.

Figure 4:
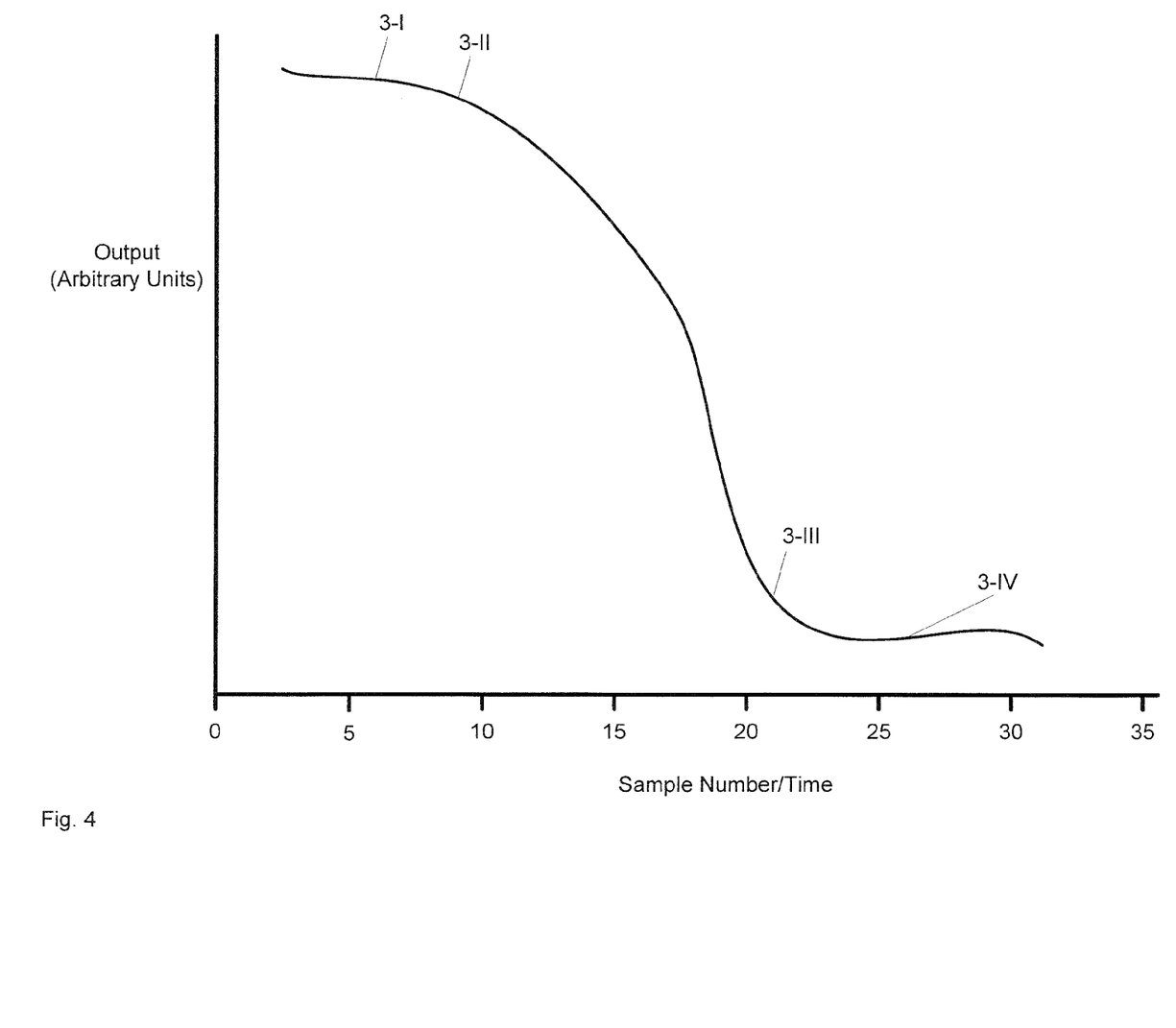
FIG. 4 depicts simulated representative output from at least one orientation sensor of the device of FIG. 1, as the device is being inserted into the carrying case, according to non-limiting implementations.

Attention is next directed to FIG. 4 which depicts simulated representative output from at least one orientation sensor 135, in arbitrary units, as a function of sample number along z-axis of coordinate system 230, as device 101 is being inserted into carrying case 203; in other words, processor 120 periodically samples and/or receives output from at least one orientation sensor 135, which measures orientation at least in the direction of the z-axis of coordinate system 230, and each successive sample is separated by about the same time period: at least one orientation sensor 135 is hence sampled at a sampling rate. Hence, as the sample number increments, time increments by a time period commensurate with the sampling rate. FIG. 4 can be indicative of how acceleration and/or velocity of device 101 is changing as a function of time and/or how acceleration and/or velocity of device 101 is changing between discrete points in time (i.e. between samples of at least one orientation sensor 135).

Further in FIG. 4, positions 3-I, 3-II, 3-III, 3-IV are indicated and the changes in acceleration between positions 3-I, 3-II, 3-III, 3-IV are apparent from the changes in orientation of device 101. Further processor 120 can determine relative velocity and/or relative acceleration of device 101 at least along the z-axis from the output.

Further, the shape of the output of the at least one orientation sensor 135 as depicted in FIG. 4 is generally appreciated to be indicative of an insertion of device 101 into a carrying case, such as carrying case 203. For example, the shape of the output of the at least one orientation sensor 135 in FIG. 4 is similar to a shape of one or more carrying-case insertion signatures 140 in FIG. 1. Hence, by determining that the output of the at least one orientation sensor 135 is similar to one or more carrying-case insertion signatures 140, processor 120 can determine that device 101 has been inserted into a carrying case and, in response, place device 101 into a carrying case mode.

While FIG. 4 only depicts output of at least one orientation sensor 135 in one direction (i.e. along the z-axis of coordinate system 230), in other implementations, at least one orientation sensor 135 can measure orientation of device in more than one direction, for example along the x-axis (i.e. laterally) and along the y-axis (i.e. longitudinally). Further, one or more carrying-case insertion signatures 140 can comprise data indicative of output of at least one orientation sensor 135 along each of the x-axis, y-axis ad z-axis of coordinate system 230 when device 101 is being inserted into a carrying case, such as carrying case 203.

Similarly, one or more carrying-case removal signatures 141 can comprise data indicative of output of at least one orientation sensor 135 along each of the x-axis, y-axis ad z-axis of coordinate system 230 when device 101 is being removed from a carrying case, such as carrying case 203.

Figure 5:
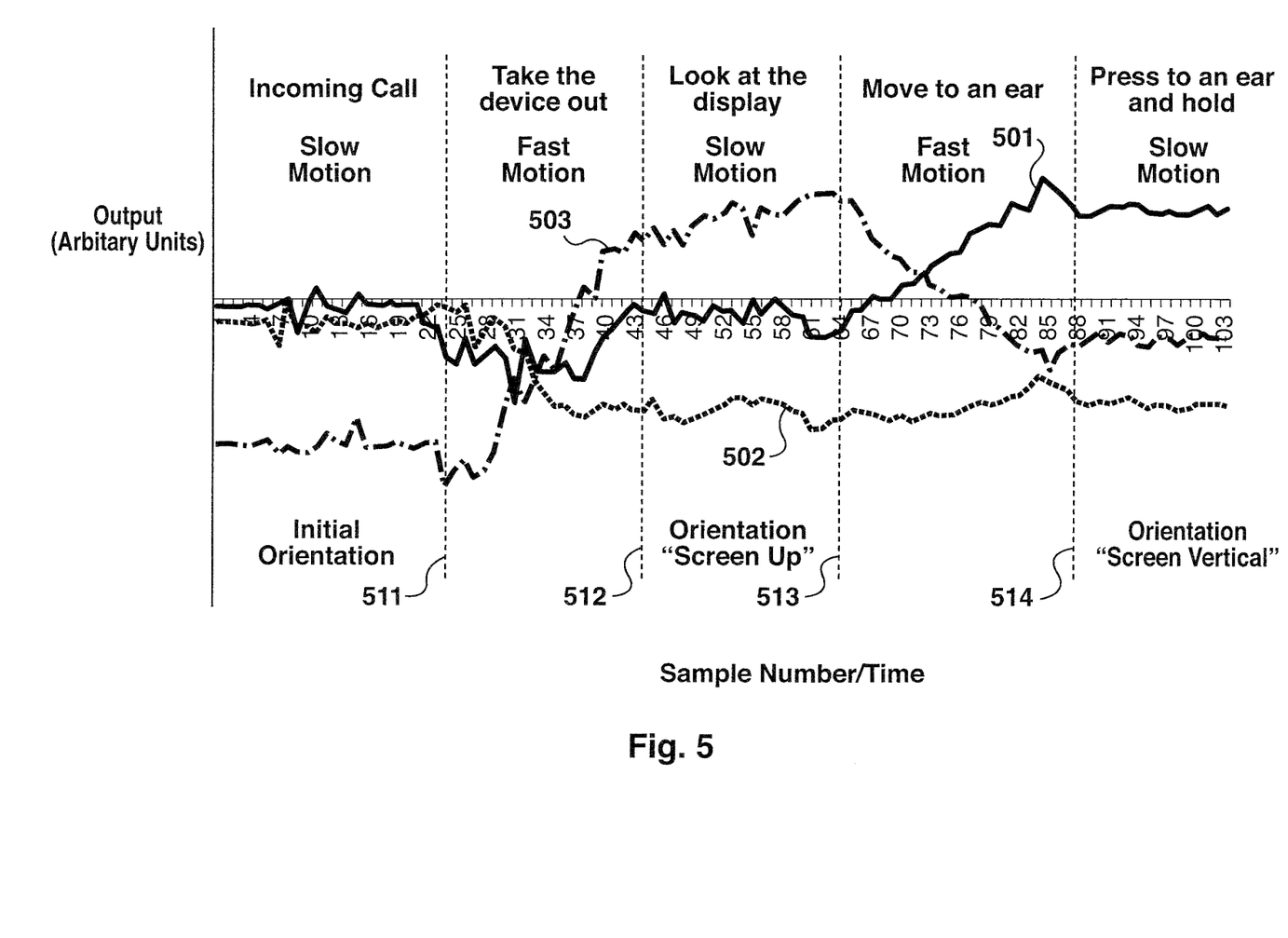
FIG. 5 depicts representative output from at least one orientation sensor of the device of FIG. 1, as the device is being removed from a carrying case, according to non-limiting implementations.

For example, attention is next directed to FIG. 5 which depicts output of at least one orientation sensor 135 along the x-axis (curve 501), the y-axis (curve 502) and the z-axis (curve 503) of coordinate system 230 as device 101 is being removed from carrying case 203. Similar to FIG. 4, the output is provided in arbitrary units as a function of sample number (i.e. time). Different regions of curves, 501, 502, 503 are also indicated by stippled lines 511, 512, 513, 514: particular, and as further labeled in FIG. 5, device 101 is in carrying case 203 and in an initial orientation (prior to line 511); a call is received at device 101, and a user removes device 101 from carrying case 203 between lines 511, 512, which can be affected by one or more of a configuration of carrying case 203, a frictional coefficient of carrying case 203; a material of carrying case 203, and the like; acceleration hence occurs along all of the x-axis, the y-axis and the z-axis, though most acutely along the z-axis. Between lines 512, 513, a user can look at display 126 where a visual notification of the call can be provided. Between lines 513, 514, device 101 can be moved to the ear of the user. After line 514, the user holds device 101 to their ear to interact with speaker 132 and microphone 134 to take the call. FIG. 5 can be indicative of how acceleration and/or velocity of device 101 is changing as a function of time and/or how acceleration and/or velocity of device 101 is changing between discrete points in time (i.e. between samples of at least one orientation sensor 135).

In any event, it is appreciated that output of at least one orientation sensor 135 can be different in each region; further processor 120 receives the output and compares the output with one or more carrying-case removal signatures 141; processor 120 will determine that a match occurs between the output between lines 511, 512 and one or more carrying-case removal signatures 141; processor 120 hence determines that device 101 has been removed from carrying case 203, and places device 101 in an out-of-carrying case mode. Indeed, prior to at least line 511, it is appreciated that device 101 can be in a carrying case mode, and after line 513, device 101 has been placed in an out-of-carrying case mode. For example, display 126 can be off in the carrying case mode, to save power at device 101, and on in the out-of-carrying case mode so that a user can examine information provided at display 126 once device 101 is removed from carrying case 203.

FIG. 5 further demonstrates that the at least one orientation sensor 135 can be configured to measure orientation of device 101 in one or more directions; hence one or more carrying-case insertion signatures 140 and/or one or more carrying case removal signatures 141 can comprise a respective signature for each of the one or more directions.

In particular, one or more carrying-case insertion signatures 140 comprises data indicative of output of at least one orientation sensor 135 when device 101 is being inserted into a carrying case, such as carrying case 203. For example, one or more carrying-case insertion signatures 140 can comprise data that was received from at least one orientation sensor 135 in one or more previous insertions of device 101 into a carrying case, and stored at memory 122, including but not limited to averages of data received from at least one orientation sensor 135 in one or more previous insertions of device 101 into a carrying case. In these implementations, processor 120 can be further configured to provision one or more carrying-case insertion signatures 140 at memory 122 by: receiving input at input device 128 to begin monitoring the output from the at least one orientation sensor 135 as a function of time; and, storing the output from the at least one orientation sensor 135 as a function of time at memory 122 as the one or more carrying-case insertion signatures 140.

In other words, device 101 can enter a learning mode to learn one or more carrying-case insertion signatures 140 when a user activates input device 128: for example, a user can interact with device 101 via input device and activate the learning mode from a drop down menu or the like. When the learning mode is entered, processor 120 monitors the output of at least one orientation sensor 135 while a user inserts device 101 into a carrying case; indeed, the learning mode can include providing instructions at display 126 to insert device 101 into a carrying case, for example within a given time period. The processor 120 can store the output of at least one orientation sensor 135 after the learning mode is entered and/or within the given time period and store the output at memory 122 as one or more carrying-case insertion signatures 140.

Alternatively, one or more carrying-case insertion signatures 140 can comprise data received by at least one orientation sensor at another device similar to device 101 when the another device was inserted into a carrying case. In yet further implementations, one or more carrying-case insertion signatures 140 can be generated heuristically based on an understanding of movement of devices when inserted into carrying cases. In other words, in these implementations, one or more carrying-case insertion signatures 140 is a generic carrying case insertion signature that is provisioned at device 101 at a factory and/or when application 145 is installed at device 101.

Similarly, one or more carrying-case removal signatures 141 comprises data indicative of output of at least one orientation sensor 135 when device 101 is being removed from a carrying case, such as carrying case 203. For example, one or more carrying-case removal signatures 141 can comprise data that was received from at least one orientation sensor 135 in one or more previous removals of device 101 from a carrying case, and stored at memory 122, including but not limited to averages of data received from at least one orientation sensor 135 in one or more previous removals of device 101 from a carrying case. In these implementations, processor 120 can be further configured to provision one or more carrying-case removal signatures 141 at memory 122 by: receiving input at input device 128 to begin monitoring the output from the at least one orientation sensor 135 as a function of time; and, storing the output from the at least one orientation sensor 135 as a function of time at memory 122 as the one or more carrying-case removal signatures 141.

In other words, device 101 can enter a learning mode to learn one or more carrying-case removal signatures 141 when a user activates input device 128: for example, a user can interact with device 101 via input device and activate the learning mode from a drop down menu or the like. When the learning mode is entered, processor 120 monitors the output of at least one orientation sensor 135 while a user removes device 101 into a carrying case; indeed, the learning mode can include providing instructions at display 126 to remove device 101 from a carrying case, for example within a given time period. The processor 120 can store the output of at least one orientation sensor 135 after the learning mode is entered and/or within the given time period and store the output at memory 122 as one or more carrying-case removal signatures 141.

In particular, the learning mode can be useful to personalize one or more carrying-case insertion signatures 140 and one or more carrying-case removal signatures 141 for users. For example, each user of similar type of carrying case and/or device can handle a device and a carrying case in a different manner: each user can have characteristic movements when inserting a device into a carrying case and/or removing a device from a carrying case, especially when the carrying case is worn on a belt, clothing, a purse and the like. Indeed, the characteristic movements can depend on a configuration of each carrying case. These characteristic movements can be captured in one or more carrying-case insertion signatures 140 and one or more carrying-case removal signatures 141 while device 101, and the like, is in the learning mode.

Alternatively, one or more carrying-case removal signatures 141 can comprise data received by at least one orientation sensor at another device similar to device 101 when the another device was removed from a carrying case. In yet further implementations, one or more carrying-case removal signatures 141 can be generated heuristically based on an understanding of movement of devices when removed from carrying cases. In other words, in these implementations, one or more carrying-case removal signatures 141 is a generic carrying case removal signature that is provisioned at device 101 at a factory and/or when application 145 is installed at device 101.

The learning mode and/or provisioning of one or more carrying-case insertion signatures 140 and one or more carrying case removal signatures 141 can occur sequentially. For example, in the learning mode, processor 120 can provide a first prompt to a user to insert device 101 into a carrying case, the first prompt comprising, for example a visual prompt at display 126 and/or a light, a light emitting diode (LED), or the like and/or an aural prompt, such as a beep from speaker 132.

When processor 120 determines that device 101 has been inserted into the carrying case (for example by determining, using the at least one orientation sensor 135, that device 101 has been motionless for a given time period, after a period of motion), processor 120 can provide a second prompt, to prompt the user to remove device 101 from the carrying case, for example an aural prompt (as visual prompting devices, such as display 126, may obscured when device 101 has been received in the carrying case.

The output of the at least one orientation sensor 135 between the first prompt and the second prompt can be stored at memory 122 as one or more carrying-case insertion signatures 140; the output of the at least one orientation sensor 135 for a given time period after the second prompt (and/or once processor 120 determines that device 101 is motionless after a period of motion after the second prompt) can be stored at memory 122 as one or more carrying-case removal signatures 141.

Furthermore, processor 120 can be further configured to track an average of the time-dependent pattern and store at least a portion of the average in memory 122 as one or more carrying-case insertion signatures 140 when the time-dependent pattern matches one or more carrying-case insertion signatures 140. In particular, processor 120 can store a running average of a given number of time dependent patterns such that one or more carrying case signatures 140 becomes more accurate and/or ages as device 101 and/or carrying case 203 ages. Furthermore, the term "given number" is appreciated to refer to a particular number and/or a number of significance; the number of time dependent patterns can also be generally predetermined and/or configured at device 101 by storing the number at memory 122 either within application 145 and/or separate from application 145.

Figure 6:
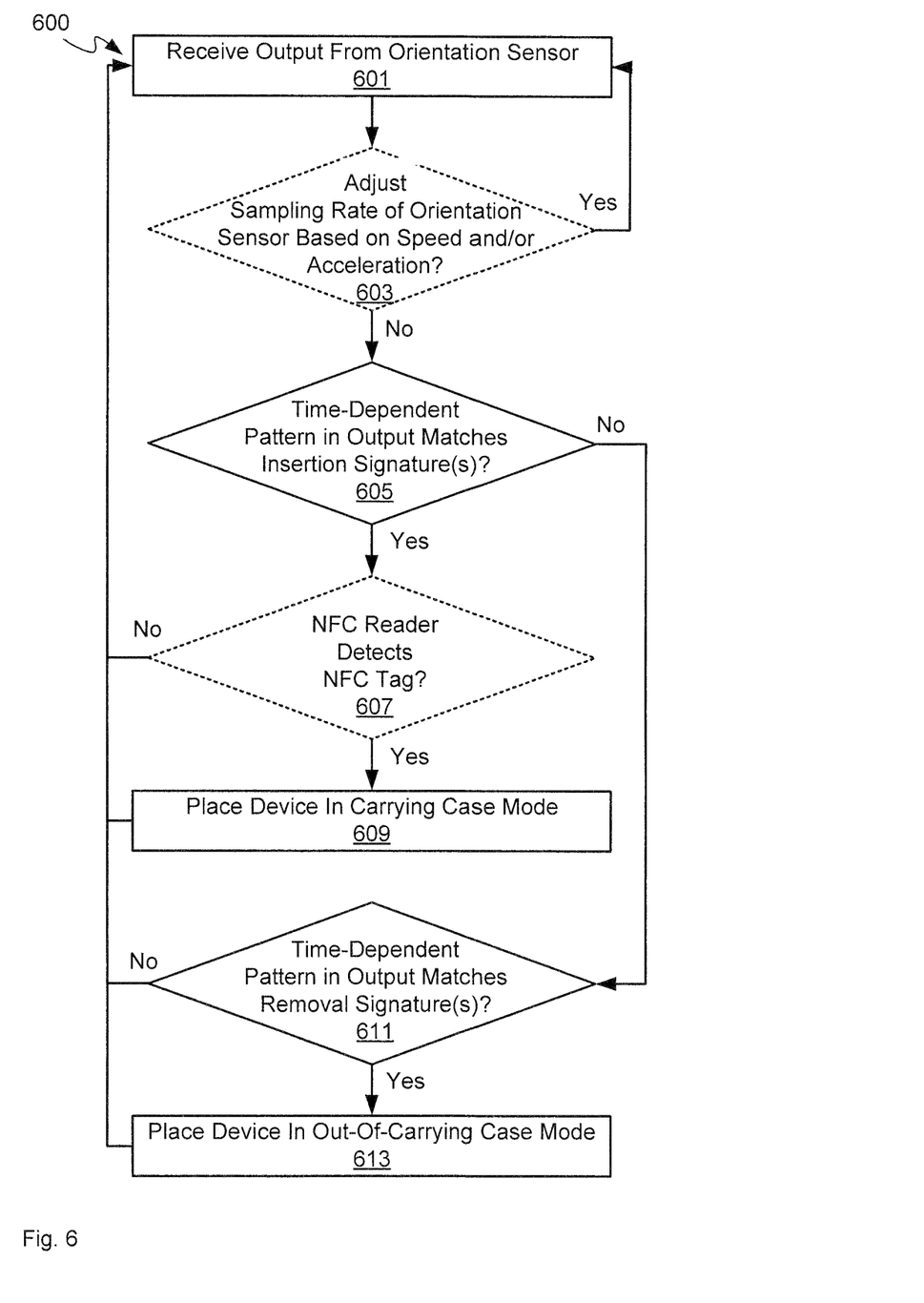
FIG. 6 depicts a block diagram of a flowchart of a method for placing a device into a carrying case mode, according to non-limiting implementations.

Attention is now directed to FIG. 6 which depicts a flowchart illustrating a method 600 for placing a device into a carrying case mode, according to non-limiting implementations. In order to assist in the explanation of method 600, it will be assumed that method 600 is performed using device 101. Furthermore, the following discussion of method 600 will lead to a further understanding of device 101 and its various components. However, it is to be understood that device 101, and/or method 600 can be varied, and need not work exactly as discussed herein in conjunction with each other, and that such variations are within the scope of present implementations. It is appreciated that, in some implementations, method 600 is implemented in device 101 by processor 120, for example by implementing application 145.

It is to be emphasized, however, that method 600 need not be performed in the exact sequence as shown, unless otherwise indicated; and likewise various blocks may be performed in parallel rather than in sequence; hence the elements of method 600 are referred to herein as "blocks" rather than "steps". It is also to be understood that method 600 can be implemented on variations of device 101 as well.

At block 601, processor 120 receives output from at least one orientation sensor 135, as described above. It is appreciated that processor 120 can be further configured to filter noise from the time-dependent pattern in the output from at least one orientation sensor 135.

At optional block 603, processor 120 can adjust a sampling rate of at least one orientation sensor 135 based on one or more of velocity and acceleration of device 101. For example, device 101 can further comprise at least one sensor for determining one or more of a velocity and an acceleration of device 101, and/or at least one orientation sensor 135 can comprise the at least one sensor for determining one or more of the velocity and acceleration of device 101.

In any event, at block 603 the processor 120 can, for example, increase the sampling rate when the velocity and/or acceleration of device 101 is increasing to ensure that data is not lost from the time-dependent pattern of output of at least orientation sensor 135; in other words, if the sampling rate is not commensurate with a velocity and/or acceleration of device 101 (i.e. the sampling rate is too slow), features of the output can be missed and/or not received at processor 120. For example, returning briefly to FIG. 5, if the sampling rate is such that output from at least one orientation sensor 135 is received only at times corresponding to lines 511, 512, 513, 514, then the features between lines 511, 512, 513, 514 will be missed. Hence, processor 120 can monitor velocity and/or acceleration of device 101 in one or more of directions along x-axis, y-axis, and z-axis of coordinate system 230 and adjust the sampling rate accordingly. For example, memory 122 can store a table (not depicted), and the like, stored at memory 122, comprising data relating one or more of velocity and acceleration to sampling rate; processor 120 can adjust the sampling rate based on data from the table.

In any event, at optional block 603, the sampling rate can be adjusted (i.e. a "Yes" decision at block 603) based on the data stored at memory 122 and block 601 can be repeated. When the sampling rate is not adjusted at block 603 (i.e. a "No" decision at block 603), at block 605, time-dependent patterns in output from at least one orientation sensor 135 are compared with one or more carrying-case insertion signatures 140. When a match occurs (i.e. a "Yes" decision at block 605), at block 609 processor 120 can place device 101 into a carrying-case mode. It is appreciated that blocks 601, 603 and 605 can all occur in parallel such that the sampling rate can be adjusted even as the processor 120 is comparing time-dependent patterns in the output of at least one orientation sensor to carrying-case insertion signatures 140.

In some implementations, however, at an optional block 607 prior to block 609, device 101 can perform an additional check to confirm the presence of a carrying case proximate and/or adjacent to device 101 using NFC reader 125: in these implementations, processor 120 is further configured to confirm carrying-case insertion when the time-dependent pattern in the output matches one or more carrying-case insertion signatures 140 and NFC reader and/or a short range RF reader detects 125 one or more of an NFC tag and a short range RF tag.

Figure 7:
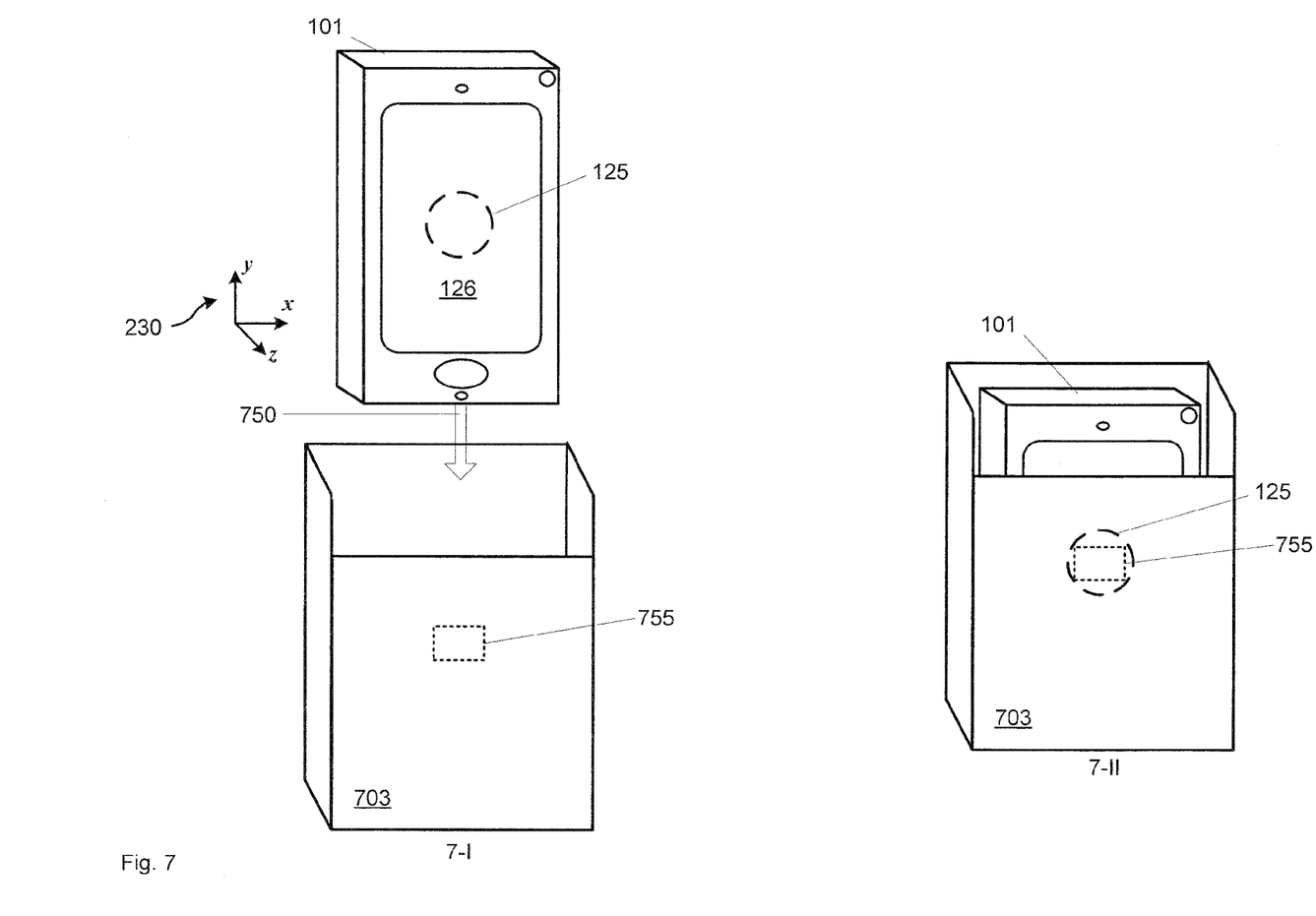
FIG. 7 depicts views of the device of FIG. 1 being inserted into a carrying case having a Near Field Communication (NFC) tag, according to non-limiting implementations.

For example, attention is directed to FIG. 7 which depicts a view 7-I of device 101 being inserted into a carrying case 703, as indicated by arrow 750. A position of NFC reader 125 at device 101 is also depicted in stippled lines, indicating that NFC reader 125 is internal to device 101. Carrying case 703 is generally similar to carrying case 203, except that carrying case 703 further comprises an NFC tag 755. NFC tag 755 is also depicted in stippled lines, indicating that NFC tag 755 can be internal to carrying case 703.

Furthermore NFC tag 755 is generally compatible with NFC reader 125; for example, when NFC reader 125 comprises an RFID reader, NFC tag 755 generally comprises an RFID tag. Furthermore, NFC tag 755 can comprise one or more of a passive NFC tag and an active NFC tag. When NFC tag 755 comprises a passive NFC tag, NFC tag 755 is generally powered from signals received from NFC reader 125. When NFC tag 755 comprises an active NFC tag, carrying case 203 can further comprise a battery, a power pack and the like for powering the active NFC tag. However, in general, NFC tag 755 remains off until receiving a query from NFC reader 125, for example a query for information stored at NFC tag 755; NFC tag 755 responds to the query by one or more of entering a handshake sequence with NFC reader 125 and transmitting information stored at NFC tag 755 to NFC reader 125.

FIG. 7 also depicts a view 7-II of device 101 received in carrying case 703 and it is appreciated that NFC tag 755 is located such that NFC reader 125 and NFC tag 755 are in approximate alignment when device 101 is received in carrying case 703. While NFC reader 125 and NFC tag 755 are depicted as interacting at a front side of device 101, in other implementations, NFC reader 125 and NFC tag 755 can interact at a rear side of device 101 (i.e. NFC tag 755 can be located at a rear of carrying case 703, and/or another NFC tag can be located at a rear of carrying case 703). NFC tag 755 can further store data identifying one or more of carrying case 703, a class of carrying case 703 and a type of carrying case 703.

Returning to FIG. 6, at block 607, processor 120 can use NFC reader 125 to query NFC tag 755 to confirm that a carrying-case insertion has occurred. Implementation of block 607 can depend on processor 120 determining that block 607 is to be implemented; for example, using a drop down menu, input device 128, or the like, a user can set a flag at device 101 to confirm carrying-case insertion using NFC reader 125. When there is no flag, block 607 is not implemented.

When NFC tag 755 is detected at block 607 (i.e. a "Yes" decision at block 607), block 609 can be implemented; when NFC tag 755 is not detected at block 607 (i.e. a "No" decision at block 607), block 609 is not implemented and block 601 reoccurs. In other words, in these implementations, two checks are performed to determine whether device 101 is being received in a carrying case: the check at block 605 to determine whether the time-dependent pattern in the output of at least one orientation sensor 135 matches the one or more carrying-case insertion signatures 140; and the check at block 607 to determine whether NFC tag 755 is detected. To avoid block 607 from implemented when a carrying case is being used that does not comprise an NFC tag, such as carrying case 203, block 607 can be optional based on whether memory 122 stores a flag indicating whether to implement block 607 or not.

It is further appreciated that method 600 can further comprise turning on NFC reader 125 after a "Yes" decision at block 605, and turning off NFC reader 125 once device 101 is placed in the carrying case mode (and/or as part of placing device 101 in the carrying case mode) to preserve battery life at device 101.

At block 609 processor 120 places device 101 in a carrying case mode. The carrying case mode can comprise a mode where at least a portion of components at device 101 can be turned off, such as display 126, a portion of display 126 and/or any visual indicators, speaker 132 and/or any aural indicators. For example, the carrying case mode can include, but is not limited to a sleep mode, a quiet and a peek mode; in the peek mode, visual indicators, such as display 126 and the like, are controlled to provide notifications and the like at areas that are not obscured by carrying case 203, for example to provide notifications of events, including, but not limited to, receipt of a message (e.g. emails, text messages etc.), receipt of a phone call, a calendar event and/or a calendar event reminder as indicated in, for example, a calendar database, and the like. However, the carrying case mode can be configurable.

At block 601, processor 120 can continue to receive output from at least one orientation sensor 135; however, at block 605, when a match does not occur between a time-dependent pattern in the output of at least one orientation sensor 135 and one or more carrying-case insertion signatures 140 (i.e. a "No" decision at block 605), at block 611, processor 120 can compare time-dependent patterns in output from at least one orientation sensor 135 with one or more carrying-case removal signatures 141. When a match occurs (i.e. a "Yes" decision at block 611), at block 613 processor 120 can place device 101 into an out-of-carrying-case mode. When a "No" decision occurs at block 611, processor 120 continues to receive output of at least one orientation sensor 135 at block 601.

While not depicted device 101 can use NFC reader 125 to determine false positives at block 611 by checking whether NFC reader 125 continues to detect NFC tag 755, presuming block 607 was implemented. When a "Yes" decision occurs at block 611 but NFC reader 125 still detects NFC tag 755. Block 613 can be skipped and block 601 continues to be implemented.

It is appreciated that blocks 601, 603, 605 and 611 can all occur in parallel such that the sampling rate can be adjusted even as the processor 120 is comparing time-dependent patterns in the output of at least one orientation sensor 135 to carrying-case insertion signatures 140 and comparing time-dependent patterns in the output of at least one orientation sensor 135 to carrying-case removal signatures 141.

In other words, processor 120 generally monitors output from at least one orientation sensor 135, compares the output to one or more carrying case insertion signatures 140 and one or more carrying case removal signatures 141 and determines whether device 101 is being inserted or removed when a corresponding match occurs.

In some implementations, blocks 611 and 613 only occur when processor 120 has previously determined that a time dependent pattern in the output of at least one orientation sensor 135 matches one or more carrying case insertion signatures 140 and/or when device 101 is in a carrying case mode. Furthermore, when device 101 is in a carrying case mode, blocks 605 to block 609 can be skipped.

Put another way, processor 120 monitors jiggle at device 101 using at least one orientation sensor 135 and when the jiggle matches a signature commensurate with insertions or removals of device 101 from a carrying case, processor 120 places device 101 into a carrying case mode or an out-of-carrying case mode, accordingly.

Persons skilled in the art will appreciate that there are yet more alternative implementations and modifications possible.

For example, in some implementations, false positives and/or false negatives can occur. In other words, processor 120 can place device 101 into a carrying case mode when device 101 is not in a carrying case and/or processor 120 can place device 101 into an out-of-carrying case mode when device 101 is in a carrying case. Hence, processor 120 can be further configured to implement a mechanism to manually place device 101 in an out-of-carrying case mode and/or manually place device 101 in a carrying case mode, for example using input device 128, drop-down menus, and the like.

Further, carrying case insertion signatures and removal signatures can be different for different carrying cases. For example, while carrying cases 203, 703 receive device 101 in a portrait orientation, other carrying cases can receive device in a landscape orientation (i.e. 90° to the orientation depicted in FIGS. 2, 3 and 7, and/or along a lateral axis, and/or along the x-axis of coordinate system 230), which results in different carrying case insertion signatures and removal signatures. Hence, device 101 can be provisioned with carrying case insertion signatures and removal signatures for a plurality of carrying cases, for example at a factory and/or when application 145 is installed at device 101.

Alternatively, when a user begins to use a new carrying case with device 101, one or more carrying case insertion signatures and one more carrying case removal signatures, respective to the new carrying case, can be downloaded to device 101 from a server, a website and the like, for storage at memory 122.

In yet a further alternative, device 101 can be controlled to enter the learning mode described above to provision device 101 with one or more carrying case insertion signatures and one more carrying case removal signatures respective to the new carrying case.

Furthermore, as device 101 and/or carrying cases 203, 703 age, the output from at least one orientation sensor 135 when device 101 is inserted or removed from carrying cases 203, 703 can change between insertions and removals. In other words, as the edges and/or surfaces of device 101 and or carrying cases 203, 703 can wear down and become rougher and/or smoother which affects the output from at least one orientation sensor 135 when device 101 is inserted or removed from carrying cases 203, 703. Eventually the output from at least one orientation sensor 135 when device 101 is inserted or removed from carrying cases 203, 703 can be different enough from one or more carrying-case insertion signatures 140 and one or more carrying case removal signatures 141 such that processor 120 may not find a match at one or more of blocks 605 and 611.

To address this issue, processor 120 can be configured to update one or more carrying-case insertion signatures 140 and one or more carrying case removal signatures 141 each time a carrying-case insertion and/or removal is detected. For example, processor 120 can be further configured to, when a match occurs at either block 605 or 611, track an average of the time-dependent pattern of output from at least one orientation sensor 135 for insertions and removals, and store at least a portion of the average in memory 122 as the one or more carrying-case insertion signatures 140 when the time-dependent pattern matches the one or more carrying-case insertion signatures 140, and further store at least a portion of the average in memory 122 as the one or more carrying-case removal signatures 141 when the time-dependent pattern matches the one or more carrying-case removal signatures 141. For example, in some implementations, processor 120 can be configured to track running average of ten of the previous time-dependent patterns of output from at least one orientation sensor 135 for insertions and removals. In this manner, the one or more carrying-case insertion signatures 140 and one or more carrying case removal signatures 141 are periodically updated based on data received from the at least one orientation sensor 135.

While is appreciated that the methods described herein could also be used with non-portable devices, the methods may be especially advantageous for mobile electronic devices that are handheld. Implementation of one or more embodiments may realize one or more additional benefits as well, such as flexibility of implementation. Further, this disclosure can be adapted to a variety of mobile electronic devices, a variety of carrying cases and/or holsters, and a variety of bodies, including, but not limited to, carrying cases open configurations and closed configurations.

Hence, provided herein are various implementations of devices that can be used to detect whether the device is mated with a carrying case when the carrying case does not comprise a magnet.

It is further appreciated that carrying cases described herein provide a convenient receptacle for holding/interacting with a device, while simultaneously providing a mechanism to enable a device to detect when the device is mated with the carrying case. The mechanism further eliminates magnets from the carrying case which generally reduces a cost of the carrying case and further is more environmentally friendly than using magnets. Further advantages of devices described herein include, but are not limited to: versatility in alerting a device that the device is mated with a carrying case, adaptability to a variety of devices, combined functionality of a mechanism for assisting a device in determining when mated therewith and a physical protector, compactness, light weight (such that the carrying case is portable, thereby supporting handheld implementations and aiding mobility and portability; further, eliminating magnets reduces a weight of a carrying case), efficiency, robustness, and enhancing the functionality of a device mated thereto without detracting from other functions of the device.

Some of the apparatus and techniques described herein can be applicable to things other than devices relating to carrying cases. For example, using sound signatures to determine a three-dimensional orientation of a portable device of a portable device in general (or a handheld device in particular) and/or a state of the portable device and/or a position of the portable device with respect to another device with which the portable device can be mated (and the like) can be useful for various applications pertaining to photography or virtual reality or gaming, for example. Hence, there is a potential benefit in that some of the components may be useful for multiple functions or operations or applications, depending on the state of the device. However, although the described concepts support eliminating magnets, the concepts may operate even if one or more magnets are present, and can work as a replacement for, or in concert with, magnets.

Those skilled in the art will appreciate that in some implementations, the functionality of device 101 can be implemented using pre-programmed hardware or firmware elements (e.g., application specific integrated circuits (ASICs), electrically erasable programmable read-only memories (EEPROMs), etc.), or other related components. In other implementations, the functionality of device 101 can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

Persons skilled in the art will appreciate that there are yet more alternative implementations and modifications possible, and that the above examples are only illustrations of one or more implementations. The scope, therefore, is only to be limited by the claims appended hereto.

The invention claimed is:

1. A device comprising:
   at least one orientation sensor;
   a memory storing one or more carrying-case insertion signatures; and,
   a processor configured to:
   receive output from the at least one orientation sensor as a function of time;
   track an average of the time-dependent pattern and store at least a portion of the average in the memory as the one or more carrying-case insertion signatures when the time-dependent pattern matches the one or more carrying-case insertion signatures; and,
   place the device in a carrying case mode when a time-dependent pattern in the output matches the one or more carrying-case insertion signatures.

2. The device of claim 1, wherein the time-dependent pattern comprises an acceleration of the device as a function of time.

3. The device of claim 1, wherein the memory further stores one or more carrying-case removal signatures and the processor is further configured to place the device in an out-of-carrying case mode when the time-dependent pattern in the output matches the one or more carrying-case removal signatures.

4. The device of claim 1, wherein the at least one orientation sensor is configured to measure the orientation of the device in one or more directions, and the one or more carrying-case insertion signatures comprises a respective signature for each of the one or more directions.

5. The device of claim 1, wherein the processor is further configured to provision the one or more carrying-case insertion signatures at the memory by:
receiving input at an input device to begin monitoring the output from the at least one orientation sensor as a function of time; and,
storing the output from the at least one orientation sensor as a function of time at the memory as the one or more carrying-case insertion signatures.

6. The device of claim 1, further comprising at least one sensor for determining one or more of a velocity and an acceleration of the device, and the processor is further configured to adjust a sampling rate of the at least one orientation sensor based on one or more of the velocity and the acceleration.

7. The device of claim 1, further comprising one or more of a near field communication (NFC) reader and a short range RF (radio-frequency) reader and the processor is further configured to confirm carrying-case insertion when the time-dependent pattern in the output matches the one or more carrying-case insertion signatures and the one or more of the NFC reader and the short range RF reader detects one or more of an NFC tag and a short range RF tag.

8. The device of claim 1, wherein the processor is further configured to filter noise from the time-dependent pattern in the output.

9. The device of claim 1, wherein the carrying case mode comprises one or more of: a sleep mode, a peek mode, and a quiet mode.

10. The device of claim 1, wherein the orientation sensor comprises one or more of a gyroscope, an accelerometer, and a magnetometer.

11. A method comprising:
at a device comprising: at least one orientation sensor; a memory storing one or more carrying-case insertion signatures; and, a processor,
receiving output at the processor from the at least one orientation sensor as a function of time;
tracking an average of the time-dependent pattern; and storing at least a portion of the average in the memory as the one or more carrying-case insertion signatures when the time-dependent pattern matches the one or more carrying-case insertion signatures; and,
the processor placing the device in a carrying case mode a time-dependent pattern in the output matches the one or more carrying-case insertion signatures.

12. The method of claim 11, wherein the time-dependent pattern comprises an acceleration of the device as a function of time.

13. The method of claim 11, wherein the memory further stores one or more carrying-case removal signatures and the method further comprises placing the device in an out-of-carrying case mode when the time-dependent pattern in the output matches the one or more carrying-case removal signatures.

14. The method of claim 11, wherein the at least one orientation sensor is configured to measure the orientation of the device in one or more directions, and the one or more carrying-case insertion signatures comprises a respective signature for each of the one or more directions.

15. The method of claim 11, further comprising provisioning the one or more carrying-case insertion signatures at the memory by:
receiving input at an input device to begin monitoring the output from the at least one orientation sensor as a function of time; and,
storing the output from the at least one orientation sensor as a function of time at the memory as the one or more carrying-case insertion signatures.

16. The method of claim 11, wherein the device further comprises at least one sensor for determining one or more of a velocity and an acceleration of the device, and the method further comprises adjusting a sampling rate of the at least one orientation sensor based on one or more of the velocity and the acceleration.

17. The method of claim 11, wherein the device further comprises one or more of a near field communication (NFC) reader and a short range RF (radio-frequency) reader and the method further comprises confirming carrying-case insertion when the time-dependent pattern in the output matches the one or more carrying-case insertion signatures and the one or more of the NFC reader and the short range RF reader detects one or more of an NFC tag and a short range RF tag.

18. The method of claim 11, further comprising filtering noise from the time-dependent pattern in the output.

19. The method of claim 11, wherein the carrying case mode comprises one or more of a sleep mode, a peek mode, and a quiet mode.

20. A computer program product, comprising a non-transitory computer usable medium having a computer readable program code adapted to be executed to implement a method comprising:
at a device comprising: at least one orientation sensor; a memory storing one or more carrying-case insertion signatures; and, a processor,
receiving output at the processor from the at least one orientation sensor as a function of time;
tracking an average of the time-dependent pattern; and storing at least a portion of the average in the memory as the one or more carrying-case insertion signatures when the time-dependent pattern matches the one or more carrying-case insertion signatures; and,
placing the device in a carrying case mode when the processor determines that a time-dependent pattern in the output matches the one or more carrying-case insertion signatures.

* * * * *